(12) United States Patent
Kramer

(10) Patent No.: US 6,199,960 B1
(45) Date of Patent: Mar. 13, 2001

(54) METHOD OF PREVENTING A VEHICLE BRAKE SYSTEM FROM DEVELOPING A VACCUM IN A LOW-PRESSURE AREA THEREOF

(75) Inventor: David J. Kramer, Rochester Hills, MI (US)

(73) Assignee: Continental Teves AG & Co., OHG (DE)

( * ) Notice: Subject to any disclaimer, the term of this patent is extended or adjusted under 35 U.S.C. 154(b) by 0 days.

(21) Appl. No.: 09/220,102

(22) Filed: Dec. 23, 1998

(51) Int. Cl.$^7$ ....................................................... B60T 8/34
(52) U.S. Cl. ................................................ 303/115.3; 303/61
(58) Field of Search ........................... 303/115.3, 89, 303/113.1, 116.1, 119.1, 61, 68, 155, 156

(56) References Cited

U.S. PATENT DOCUMENTS 3,601,452 * 8/1971 Brunner ............................. 303/61 X
3,617,098 * 11/1971 Leiber ................................ 303/61 X
4,859,005 * 8/1989 Rey et al. .......................... 303/119.3
5,346,292 * 9/1994 Hall ..................................... 303/156
5,882,093 * 3/1999 Enomoto et al. .............. 303/119.1 X

* cited by examiner

Primary Examiner—Robert J. Oberleitner
Assistant Examiner—Melanie Talavera
(74) Attorney, Agent, or Firm—Rader, Fishman & Grauer PLLC

(57) ABSTRACT

A method of preventing a vacuum from developing in a low-pressure area of a vehicle anti-lock brake system comprises providing periodically opening normally closed electromagnet valves when brakes are not applied, the valves connecting wheel brakes to a tandem master cylinder by low pressure lines passing through the low-pressure area. As a result, pressures in a tandem master cylinder of the system and the low-pressure area level off and thus a vacuum trapped in the low-pressure area is eliminated.

1 Claim, 3 Drawing Sheets

METHOD OF PREVENTING A VEHICLE BRAKE SYSTEM FROM DEVELOPING A VACCUM IN A LOW-PRESSURE AREA THEREOF

BACKGROUND OF THE INVENTION

1. Field of the Invention

The present invention relates to anti-lock brake systems (ABS) and/or traction control systems (ASR, for anti-slip regulation), more particularly to evacuating and filling an ABS unit, and still more particularly to preventing the system from developing air pockets in a low-pressure accumulator area affecting braking performance.

2. Description of the Related Art

ABS (and ASR) is a part of the standard equipment in medium-class and upper-class vehicles. These systems are becoming increasingly included in lower-category and low-cost cars.

ABS and their variations typically comprise a hydraulic control unit (HCU) that houses hydraulic components of the system. The HCU is connected to the vehicle brake system between its master cylinder and calipers of wheel brakes.

A conventional hydraulic brake system, a one-wheel circuit 10 of which is shown in FIG. 1, comprises a tandem master cylinder (TMC) common for all wheels (shown is an inlet 12 from TMC), a HCU 14, and a wheel caliper (shown in FIG. 1 is an outlet 16 to the wheel caliper). Depicted within dotted lines is a low-pressure portion 18 of the HCU 14. The portion 18 typically contains a low-pressure accumulator 20, an input portion 22 of a return pump 24, and associated lines 26 and 28. A motor 30 drives the return pump 24. Depicted in FIG. 1 are also a return pump outlet valve 32, a noise damper 34, and two electromagnet valves: a pressure buildup normally open (NO) valve 36 and a pressure reduction normally closed (NC) valve 38. The pressure buildup electromagnet NO valve 36 is disposed in a brake line 40 connecting the inlet 12 from TMC to the outlet 16. A check valve 42 is connected in parallel to the NO valve 36. The pressure reduction electromagnet NC valve 38 is placed in a return line 44 that eventually, through the return pump 24 reunites with a main brake line 46.

Prior to filling the system including the circuit 10 with brake fluid, a vacuum is applied at the TMC to remove air from the system. When the vacuum is applied to the HCU, a portion of the unit, namely the low-pressure circuit, is isolated and does not evacuate its air. Any air bubbles still present in the hydraulic medium may bring about such an elasticity of fluid columns formed by the medium that the brake pressures required in wheel brake cylinders are not brought about to the requisite level.

ABS/ASR brake systems have several NC electromagnet valves; the valves of return pumps used in these brake systems are normally closed as well. The problem therefore exists that pockets of air may be present downstream of the NC electromagnet valves, and also downstream of the return pump valves. The air in these pockets may possibly be removed only with difficulty using liquid.

It has been proposed that at least the NC valves be triggered electrically upon evacuation and prior to filling of the system, and thus opened. To do so, special plug connections must be used to supply current to these electromagnet valves. The connections of this kind are expensive and involve operating costs when used, let alone that they are also complicated to manufacture. For many applications, therefore, it is the customer's desire not to energize the NC valves during the evacuation/filling process because of those issues involved.

To avoid the need to electrically energize the valves at the assembly plant, a one-time bleed valve with reset capability for an anti-lock hydraulic control unit has been put forward to address the problem of evacuating the low-pressure circuit. The bleed valve comprises a piston that can be sealingly installed into a bore made in the body of the hydraulic control unit. The bore is sized to create a seal when the piston is pushed into the bore in response to a brake pressure. On one of its ends, the bore is in communication with the primary hydraulic pressure circuit. On another end, it is connected with the low-pressure line. Due to such a structure of the bleed valve, an air communication is established between the primary hydraulic pressure circuit and the low-pressure line when the piston sits loosely in the bore. By virtue of that communication, air can be evacuated from the low-pressure brake circuit when it is exposed to a vacuum applied to the primary hydraulic pressure circuit.

However, all the advantages of such a solution notwithstanding, the placing of the bleed valve into the hydraulic system still may not fully prevent a vacuum from developing over time in the low pressure accumulating area after several normal brake pedal depressions. Specifically, the vacuum can be created upon brake pedal release. The accumulated vacuum may lead to air gaining access into the system and thus to a "soft pedal". Also, when the HCU subsequently goes into an ABS mode, the trapped air can be pumped into the brake circuit causing reduced brake performance.

Accordingly, a need as yet exists in the art to provide a reliable means for evacuating the low-pressure circuit.

SUMMARY OF THE INVENTION

Therefore, a primary object of the present invention is to provide a hydraulic brake system that would retain all the advantages of the systems in the art, not being subject to their drawbacks discussed in the above.

Another object of the present invention is to provide a method of preventing a vehicle brake system from developing a vacuum in its low-pressure area.

In accordance with the principles of the present invention confined to a vehicle anti-lock brake system of the type including a tandem master cylinder, wheel brakes, and a hydraulic control unit with NO valves connecting the tandem master cylinder with the wheel brakes through primary hydraulic pressure lines, and NC valves that connect the wheel brakes to the tandem master cylinder by low-pressure lines passing through a low-pressure area, the method provides for opening the NC valves periodically when brakes are not applied.

Specifically, the periodical opening of the NC valves is performed each time the ignition is shut off.

Upon periodical opening the NC valves, pressures in the tandem master cylinder and in the low-pressure area are equalized and that eliminates a vacuum trapped in the low-pressure area.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a schematic diagram of an improved hydraulic brake system that the present invention can be applied to.

DESCRIPTION OF THE PREFERRED EMBODIMENTS

Figure 1:
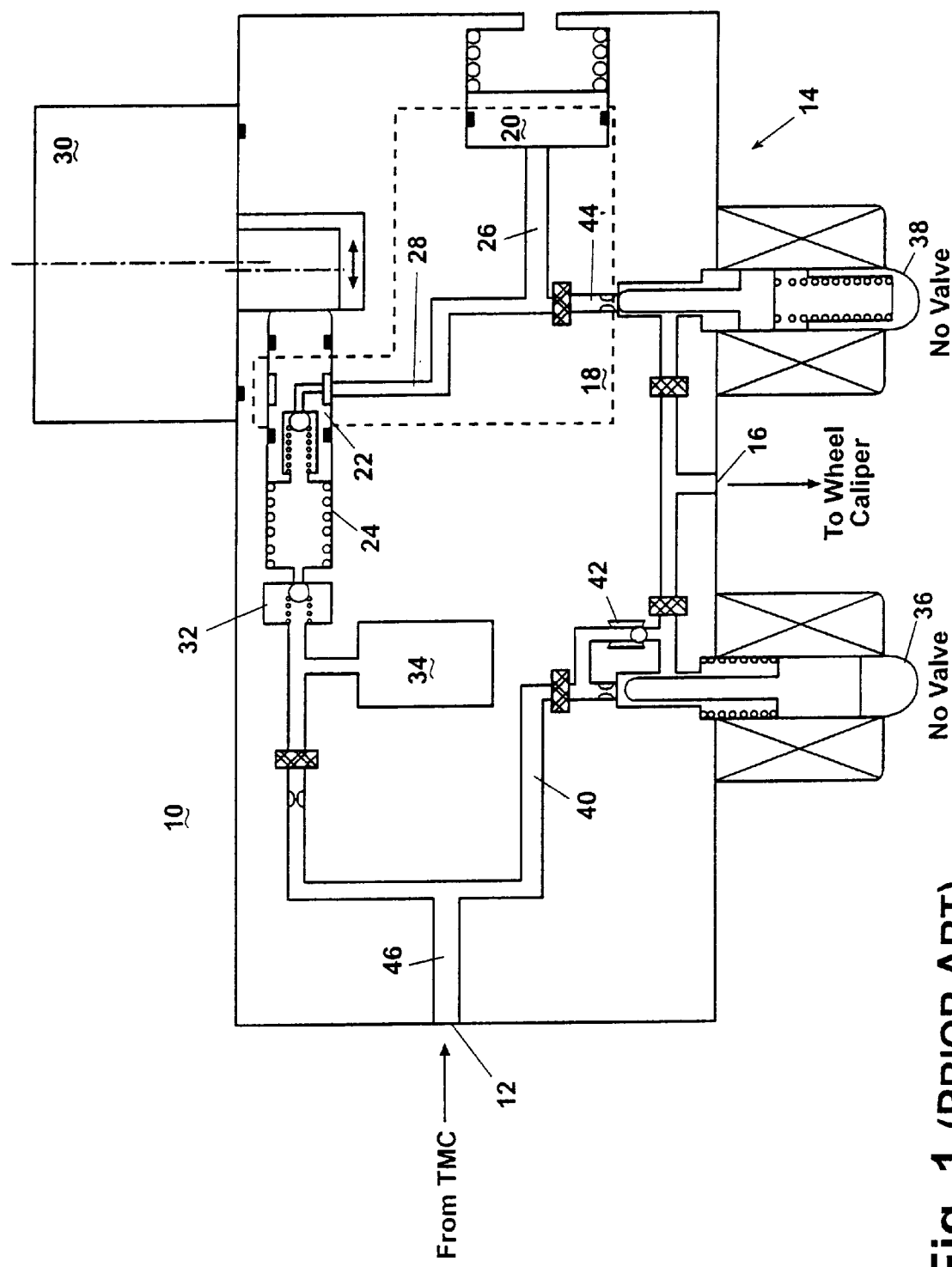
FIG. 1 shows a schematic diagram of a hydraulic brake system illustrating the area of application of the present invention.
Figure 2:
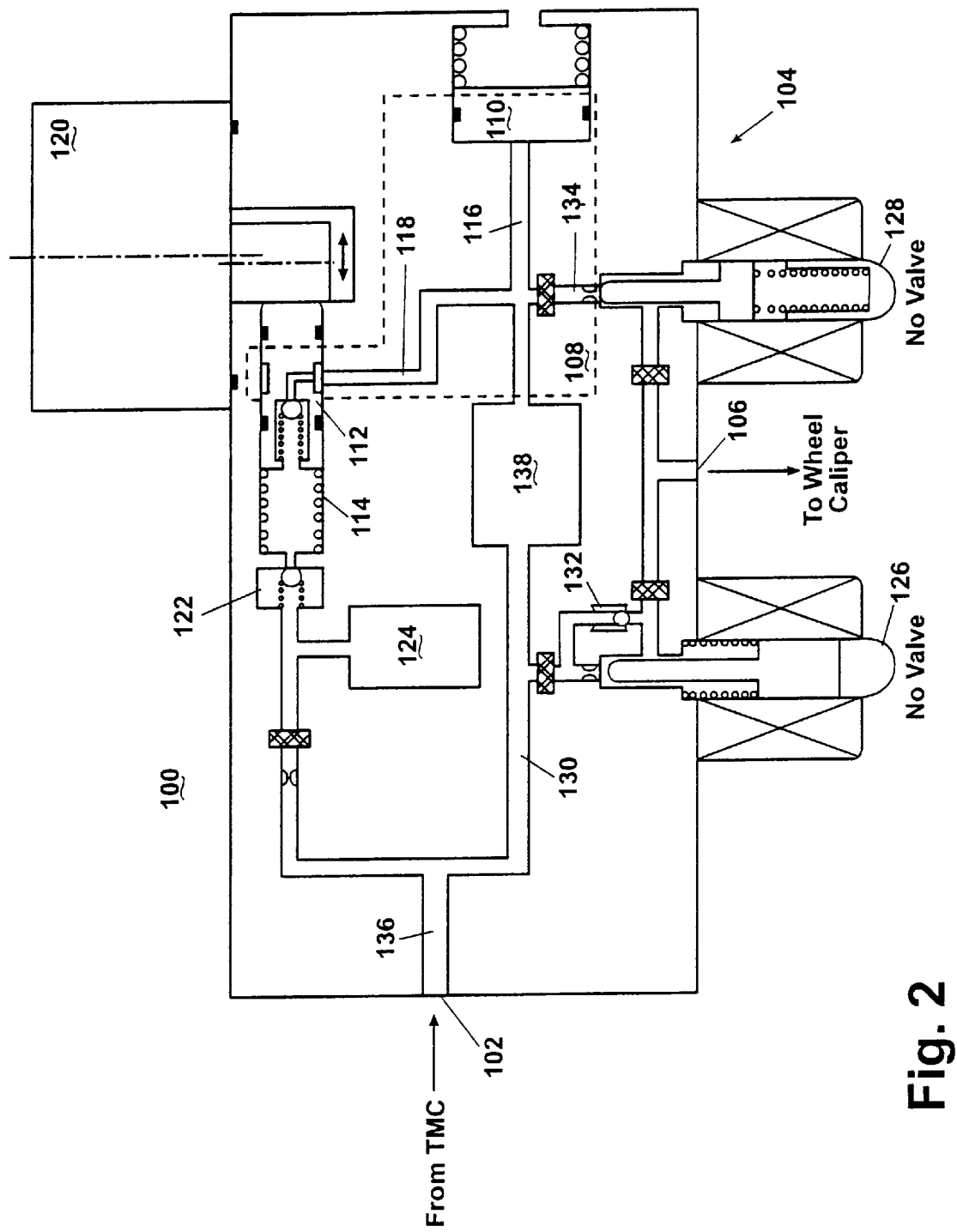

Referring now to FIG. 2 where a schematic diagram of a hydraulic brake system 100 that can host the present invention is shown, the system 100 comprises all the principle components of the conventional system 10 depicted in FIG. 1. Specifically, it has a TMC supplying brake fluid to all wheels, the TMC being represented in FIG. 2 by an inlet 102; a HCU 104; and a wheel caliper of a wheel brake defined in FIG. 2 by an outlet 106 thereto.

A low-pressure portion 108 of the HCU 104 is shown within a dotted contour. It contains a low-pressure accumulator 110, an input portion 112 of a return pump 114, and associated low-pressure lines 116 and 118. A motor 120 drives the return pump 114. Illustrated in FIG. 2 are also a return pump outlet valve 122, a noise damper 124, and two electromagnet valves: a pressure buildup NO valve 126 and a pressure reduction NC valve 128. The pressure buildup electromagnet NO valve 126 is disposed in a brake line 130 connecting the inlet 102 from TMC to the outlet 106. A check valve 132 is also connected in parallel to the NO valve 126. The pressure reduction electromagnet NC valve 128 is placed in a return line 134 that eventually, through the return pump 114 reunites with a primary hydraulic pressure circuit 136.

Figure 3:
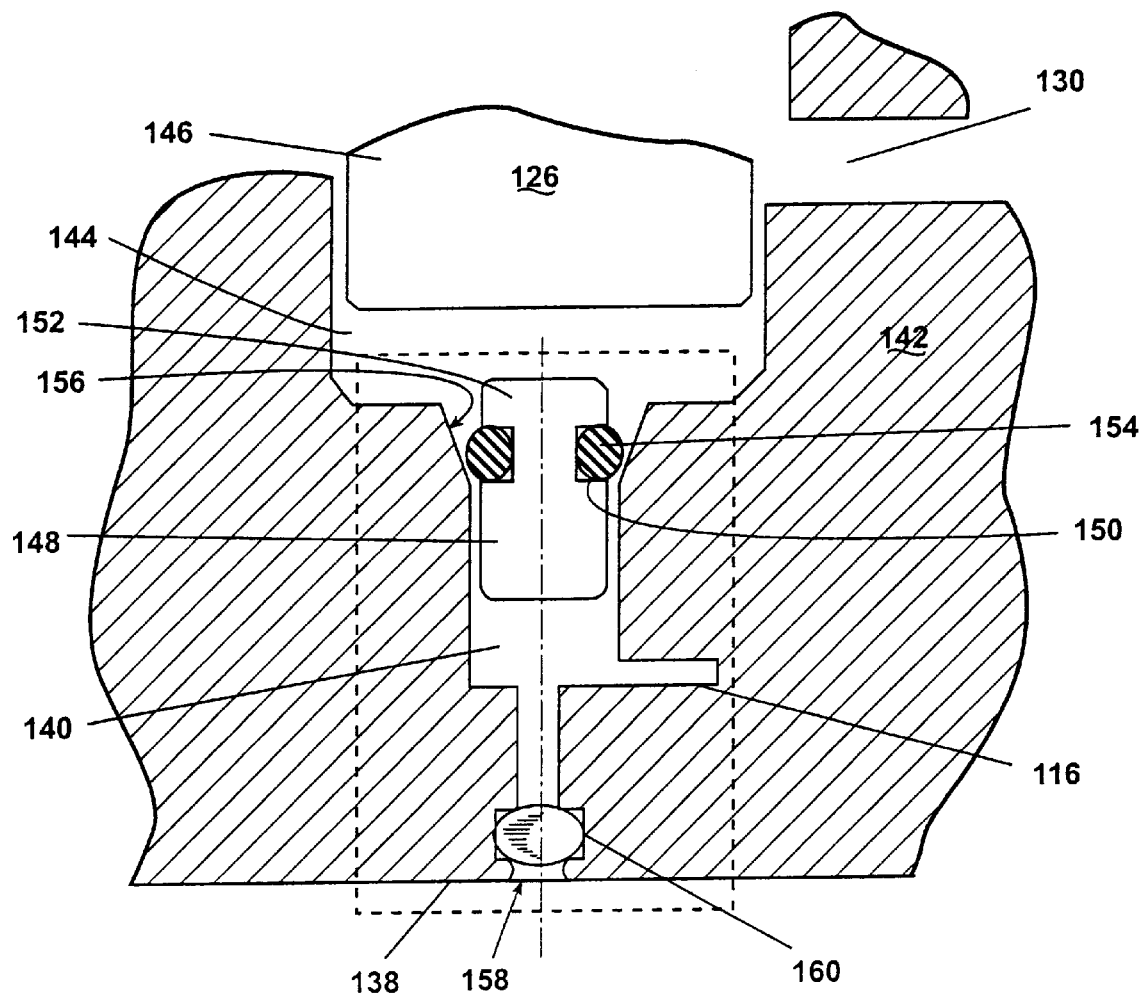
FIG. 3 illustrates a one-time bleed valve used with the system of FIG. 2.

In addition, the system 100 comprises a one-time bleed valve 138 of the type discussed in the above and connected between the low-pressure line 116 and the main brake line 136. Shown in FIG. 3, the bleed valve 138 is structurally assembled in a bore 140 made in a body 142 of the HCU 104. The bore 140 is arranged in the body 142 in such a way that on one of its ends it is connected to the line 130 of the TMC primary hydraulic pressure circuit 136, and on another of its ends it is connected to the low-pressure line 116. To obtain an easy access from the bore 140 to the line 130, it was found convenient to make the bore 140 at a recessed part 144 of the body 142 that accommodates the NO valve 126, and more specifically, immediately below the body 146 of the valve 126. The valve 138 comprises a piston 148 with an annual groove 150 made on a head portion 152 of the piston 148, and an O-ring 154 assembled in the groove 150. The diameter of the bore 140 is sized to create a seal when the piston 148/O-ring 154 combination is pushed downward into the bore 140. The bore 140 is provided with a lead-in chamfer 156 to facilitate the piston/O-ring combination to be pushed into the bore.

Provided as an auxiliary feature of the bleed valve 148 is an access hole 158 to reset the valve 138 after a leak test. The feature will be discussed below in more detail. The access hole 158 can be sealed with a ball 160.

The piston 148 is initially assembled loosely into the bore 140 so that it rests in the lead-in chamfer 156. The body 146 of the NO valve 126 limits from above the piston's travel to allow only a predetermined amount of stroke when operating.

At the rest condition, the piston 148 is loosely set into the bore 140 so that it rests on the lead-in chamfer 156. If an air-leak test is conducted on the HCU 104 prior to shipment of the system 100 to an OEM, high pressure is applied to the main circuit, that is to primary hydraulic pressure circuit 136, the low-pressure circuit remaining at the atmospheric pressure. The pressure difference will force the piston 148 into the bore 140, thus sealing the path between the lines 130 and 116. After the test is completed, a rod (not shown) is inserted in the access hole 158 to push the piston back out of the bore 140 resetting it for the evacuation process. The feature of accessing the piston 148 through the hole 158 is not needed if the air-leak pretest is not required.

After the HCU 104 is installed into a vehicle, the evacuation process applies a vacuum to the main circuit 136 (and hence to the line 130). The valve 138 is forced open due to the atmospheric pressure in the low-pressure line 116, thus allowing the air to be evacuated. When brake fluid is inserted into the system at low pressure, the valve 138 will close again.

When brake pressure is applied at the proof pressure load during a test on a vehicle assembly line, a large pressure drop will ensure that the piston 148 will move completely into the bore 140. During normal brake operation, the piston 148 seals the line 130 from the low-pressure line 116. When a transient vacuum is applied due to brake pedal release, friction of the O-ring 154 holds the valve 138 in place. Also, an undercut (not shown) may be used in the bore 140 to further prevent the valve 138 from moving backward after it has been seated.

A software controlling an electronic control unit (ECU, not shown in the drawings) of the vehicle provides for pulsing each of NC valves 128 not long after the engine is off. Preferably, the delay does not exceed several minutes. Additionally, during continuous drive, the software may pulse the NC valves periodically at the moments the brakes are not applied that may be detected, for example, via a brake light. As a result of opening the NC valves 128, pressures in primary brake line 130 and low-pressure area 108 level off, and the vacuum developed in the low-pressure area is thus eliminated.

While the foregoing description relates to a preferred exemplary embodiment of the present invention, it is to be understood that this embodiment is given by example only and not in a limiting sense. Those skilled in the art may make various modifications and additions to the preferred embodiment chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. A method of preventing a vacuum from developing in a low-pressure area of a vehicle anti-lock brake system of the type including a tandem master cylinder, wheel brakes, and a hydraulic control unit, said hydraulic control unit comprising normally open electromagnet valves and normally closed electromagnet valves, said tandem master cylinder being connected to said wheel brakes by primary hydraulic pressure lines via said normally open electromagnet valves, said wheel brakes being connected back to said tandem master cylinder by low-pressure lines via said normally closed electromagnet valves, said low pressure lines passing through a low-pressure area, said method comprising the steps of:

opening normally closed electromagnet valves periodically when brakes are not applied and each time said vehicle's ignition is shut off, to thereby equalize pressure in said tandem master cylinder and said low-pressure area and thus eliminate a vacuum trapped in said low-pressure.

* * * * *